(No Model.)
S. D. WARFIELD.
CORN SILKER.
No. 309,999. Patented Dec. 30, 1884.
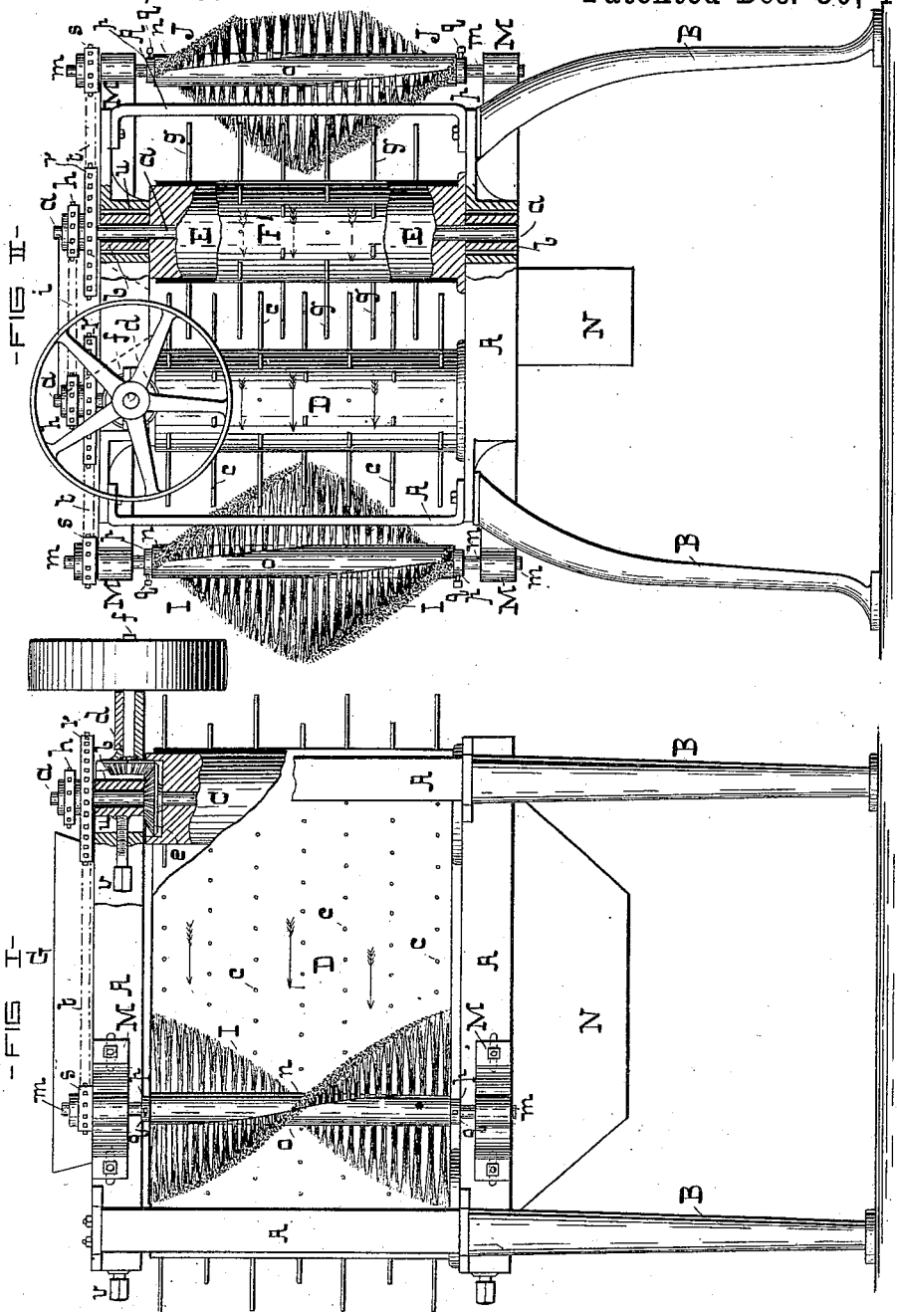
WITNESSES
Danl Fisher
Chas. B. Cassady.
INVENTOR
Sol. Davies Warfield
by G. H. & W. T. Howard,
Attys.

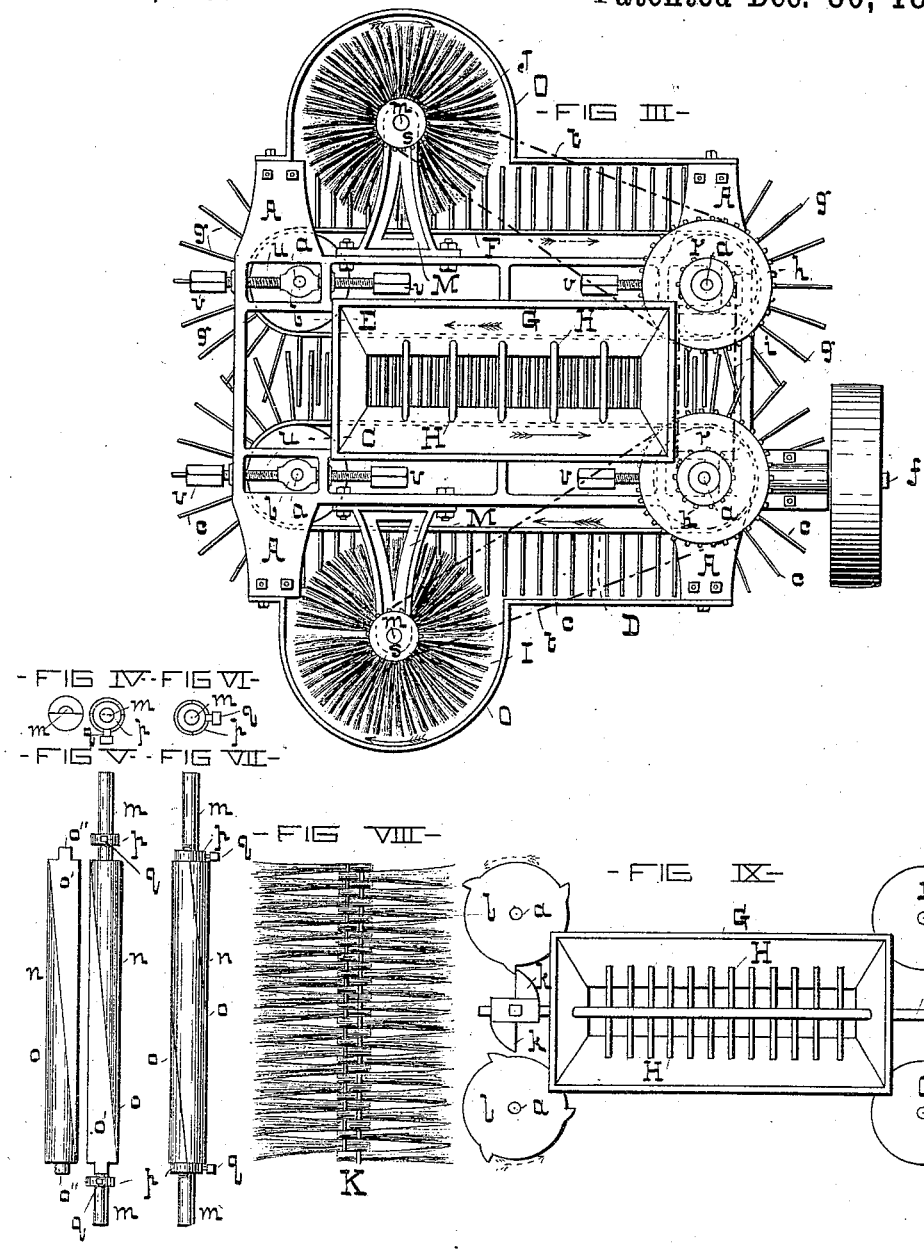

UNITED STATES PATENT OFFICE.

SOLOMON DAVIES WARFIELD, OF BALTIMORE, MARYLAND.

CORN-SILKER.

SPECIFICATION forming part of Letters Patent No. 309,999, dated December 30, 1884.

Application filed May 31, 1884. (No model.)

*To all whom it may concern:*

Be it known that I, SOLOMON DAVIES WARFIELD, of the city of Baltimore and State of Maryland, have invented certain Improvements in Corn-Silkers, of which the following is a specification.

This invention relates to certain improvements in that class of corn-silkers in which the silk is removed from the cut corn by means of endless belts or aprons carrying fingers.

In the drawings forming a part thereof, Figure I is a partly-sectional side view of the machine. Fig. II is a partly-sectional end view of the same. Fig. III is a plan of the invention. Figs. IV to IX, inclusive, are details of the invention.

A is a frame supported by legs B.

C C are rollers having gudgeons $a$, which revolve in bearings $b$ on the frame A. These rollers are connected by an endless belt or apron, D, having projecting fingers $c$, and the said rollers are driven by means of beveled gears $d$ and $e$ from the driving-shaft $f$. The direction of movement of the belt D is indicated by the arrows in full lines in Figs. I, II, and III.

E E are rollers similar to the ones C, having a belt, F, and fingers $g$, which belt and fingers correspond to those described in connection with the rollers C. The two endless belts are at such distance apart that the opposing fingers interlock, as shown in Figs. II and III. The direction of motion of the belt F is shown by arrows in dotted lines in Figs. II and III.

One of the rollers E is connected to the driven one of the rollers C by means of sprocket-wheels $h$ and the chain belt $i$. (See Figs. I, II, and III.)

G is a feed-hopper attached to the upper section of the frame A, into which the cut corn to be silked is poured.

H H are distributing-bars in the feed-hopper G, to provide a regular feed of corn to the silking-fingers $c$ and $g$. In Fig. III these distributing-bars H are stationary, and in Fig. IX they are movable and susceptible of a reciprocating motion in the hopper through the medium of a central shaft, $j$, having dogs $k$ thereon, and the spur-wheels $l$, which are keyed to the gudgeons $a$ of the rollers C and E at one end of the machine. It will be seen that the spur-wheels $l$ are revolved in opposite directions, as indicated in Fig. IX by arrows in broken lines; consequently the dogs $k$ are alternately acted upon by the spurs, and the central shaft, $j$, carrying the distributing-bars H, reciprocated.

When the cut corn is in a comparatively dry condition, and free from scrapings of the cob, as is canned by some packers, the stationary bars H are employed; but when the corn is prepared, as is preferred by other packers, with a quantity of the scrapings from the cob mixed with the grain, the whole forming a pulpy mass, the reciprocating separating-bars H shown in Fig. IX are used to loosen the mass and feed it from the hopper.

I and J are cleaning-brushes to remove silk from the fingers $c$ and $g$, and they are made as follows: A spindle, $m$, has a hub, $n$, which consists of two longitudinal sections, $o$, having spiral abutting faces $o'$, extending lengthwise of the hub. The spindle $m$ is a continuation of one of the sections $o$ of the hub $n$, and is notched. The other section $o$ of the hub has projections $o''$, which fill the notches in the spindle and admit of the application of the collars $p$ to complete the joint thus formed. A mat, K, constructed of bristles or broom-corn, (see Fig. VIII,) is inserted between the two spiral faces of the hub and fastened. When the mat is to be removed, the set-screws $q$ are slackened and the collars $p$ moved from over the projection $o''$, which releases the removable section of the hub. By this construction a cheap and effective spiral brush is obtained, the mat of which can be easily and readily removed and renewed. The brushes I and J are placed exteriorly of the belts D and F, and are supported in brackets M from the frame A, and they are revolved in contrary directions to the adjacent belts, as shown by the arrows, through the medium of sprocket-wheels $r$ and $s$ and the chain belts $t$.

Parts of the invention not yet alluded to will be described and their uses set forth in the description of the operation of silking corn by means of the apparatus which follows. Supposing the machine to be in operation, corn as cut from the cob is introduced to the hopper G, whence it passes between the bars H to between the belts D and F and is caught by the fingers c and g. The fingers separate the silk from the grain and carry the former to the exterior of the machine, where it is removed from the fingers c and g by the brushes I and J, the corn falling to a chute, N, which conducts it to any suitable receptacle placed beneath it. The length of the fingers on each belt is such that their ends come nearly in contact with the opposite belt, and as they interlock a complete net-work of fingers moving in contrary directions is formed, which separates the corn when adhering together and thoroughly mixes it, and in this operation removes every particle of silk therefrom.

It will be understood that, in view of the fingers c and g moving in opposite directions, scattering of the corn endwise of the machine is entirely obviated. The brushes I and J, being of spiral form, offer less resistance to the movement of the fingers than would brushes in which the bristles were in rows parallel with their axes, and their direction of rotation is such as to conduct the removed silk to below the machine. Fenders O (shown only in Fig. III) serve to prevent scattering of the silk after its removal from the fingers.

In order that the endless belts may be given the proper tension, the bearing-boxes for the gudgeons $a$, at one or both ends of the machine, are confined in slots $u$ and adjusted and held in position therein by means of set-screws $v$. (See Figs. I and III.)

In the machine shown in the drawings the endless belts are of leather or gum; but they can be formed of slats or chain belts united transversely by slats carrying fingers.

It is not absolutely necessary that the endless belts should move in a horizontal plane, as shown, as it is obvious that substantially the same effect would be produced by belts moving in an oblique or vertical plane.

I claim as my invention—

1. In a corn-silking machine, a pair of endless belts driving rollers, placed side by side, said belts being provided with fingers which interlock, substantially as described, combined with means to effect the movement of the said belts in opposite directions, substantially as specified.

2. In a corn-silking machine, a pair of endless belts, placed side by side, provided with interlocking fingers, and adapted to move in opposite directions, substantially as described, combined with a hopper arranged to conduct corn to between the said belts, substantially as specified.

3. In a corn-silking machine, a pair of endless belts, placed side by side, carrying interlocking fingers, and adapted to move in opposite directions, combined with revoluble brushes to remove silk from the said fingers, substantially as specified.

4. In a corn-silking machine, a pair of endless belts, placed side by side, carrying interlocking fingers, and adapted to move in opposite directions, combined with a feed-hopper having separating feed-bars, substantially as specified.

5. In a corn-silking machine, a pair of endless belts, placed side by side, carrying interlocking fingers, and adapted to move in opposite directions, combined with a feed-hopper having reciprocating feed-bars, substantially as specified.

6. In a corn-silking machine, the combination of a pair of endless belts driving rollers, placed side by side, said belts carrying interlocking fingers, and adapted to move in opposite directions, and means for adjusting the distance between the gudgeons of the said rollers to regulate the tension of the belts, substantially as specified.

7. In a corn-silking machine, a series of moving silking-fingers, combined with a brush which consists of a spindle divided longitudinally into two sections, a flexible mat placed between the said sections, and means to secure the whole together, substantially as and for the purpose specified.

8. In a corn-silking machine, a series of moving silking-fingers, combined with a brush which consists of a spindle having a gudgeon at each end, with a removable section which extends longitudinally thereof and is situated between the said gudgeons, a flexible mat placed between the said sections, and means to secure the whole together, substantially as specified.

9. In a corn-silking machine, a series of moving silking-fingers, combined with a brush which consists of a spindle in sections having spiral abutting faces, a flexible mat, and means to secure together the two sections of the spindle on the said mat, substantially as and for the purpose specified.

10. In a corn-silking machine, an endless moving belt carrying silking-fingers, combined with a brush which consists of a spindle in sections having spiral abutting faces, a flexible mat, and means to secure together the two sections of the spindle on the said mat, substantially as and for the purpose specified.

11. In a corn-silking machine, an endless moving belt carrying silking-fingers, combined with a brush which consists of a spindle in sections having spiral abutting faces, a flexible mat, means to secure together the two sections of the spindle on the said mat, and mechanism whereby the said brush is revolved in a direction opposite to that of the moving belt, substantially as specified.

SOLOMON DAVIES WARFIELD.

Witnesses:
WM. T. HOWARD.
CHAS. B. CASSADY.